United States Patent [19]

Honigsbaum

[11] Patent Number: 5,208,724
[45] Date of Patent: May 4, 1993

[54] PROCESS AND APPARATUS FOR REDUCING THE DIFFERENCE IN ELECTRIC POTENTIAL BETWEEN A FLYING HOVERCRAFT AND EARTH GROUND

[76] Inventor: Richard F. Honigsbaum, A-21 Barry Gardens, 245 Passaic Ave., Passaic, N.J. 07055

[21] Appl. No.: 713,580

[22] Filed: Jun. 11, 1991

Related U.S. Application Data

[63] Continuation of Ser. No. 358,563, May 26, 1989, abandoned.

[51] Int. Cl.⁵ .......................... H05F 3/02; B64D 1/18
[52] U.S. Cl. ................................... 361/218; 239/171
[58] Field of Search ............................. 361/216–218, 361/220, 232; 239/171; 169/53; 244/136

[56] References Cited

U.S. PATENT DOCUMENTS

| | | | |
|---|---|---|---|
| 1,757,111 | 5/1930 | Crossley | 174/2 |
| 3,600,632 | 12/1969 | Bright et al. | 361/218 |
| 3,802,625 | 1/1973 | Buser et al. | 361/218 |
| 3,893,005 | 7/1975 | Corbin | 317/2 E |
| 4,059,846 | 11/1977 | Eisenhauer | 361/212 |
| 4,228,479 | 10/1980 | Larigaldie et al. | 361/218 |
| 4,328,940 | 5/1982 | Malcolm | 361/218 |
| 4,886,221 | 12/1989 | Honigsbaum | 361/218 |

OTHER PUBLICATIONS

"Electrostatic charging of the CH-53E Helicopter", Pechacek et al., Nov. 29, 1985, pp. 27–29.

Primary Examiner—A. D. Pellinen
Assistant Examiner—Richard T. Elms
Attorney, Agent, or Firm—Cohen, Pontani, Lieberman, Pavane

[57] ABSTRACT

The risk of electrocution by first contact with a hovercraft is eliminated by first establishing an alternate path for electric charge between the hovercraft and earth ground via an electrically conducting liquid stream.

9 Claims, 2 Drawing Sheets

PROCESS AND APPARATUS FOR REDUCING THE DIFFERENCE IN ELECTRIC POTENTIAL BETWEEN A FLYING HOVERCRAFT AND EARTH GROUND

This is a continuation of U.S. application Ser. No. 07/358,563, filed May 26, 1989 now abandoned.

BACKGROUND OF THE INVENTION

1. Field of the Invention

This invention relates to conductive charge removal from hovercraft and more particularly to conductive charge removal via a liquid stream that completes a conductive path between the hovercraft and earth ground.

2. Prior Art

The risk of electrocution from first contact with a hovercraft by persons at earth ground is well known, and actual potentials and charging rates have been measured and are detailed in (U.S.) Naval Research Laboratories Memorandum Report Number 5676, *Electrostatic Charging of the CH-53E Helicopter*, Pechacek et al.

Eisenhauer, U.S. Pat. No. 4,059,846, describes a sea-rescue arrangement in which a raft is lowered to and raised from the sea surface by a helicopter, and in which the potential difference between the raft and the sea is eliminated by a weighted grounding wire that hangs below, and makes first contact with, the water. While Eisenhauer's arrangement is quite satisfactory for its intended purpose of stand-by rescue at power boat races, it is an impractical arrangement for rescue in combat situations where rafts are not generally used and the weight can injure victims and/or the rescuers that enter the water to assist them, and the wire can become entangled in helicopter rotor blades.

Corbin, U.S. Pat. No. 3,893,005, describes a grounded pole that is used to drain charge from and to attach a load to a helicopter. While Corbin's arrangement may be effective in the hands of a skilled user, in combat situations where the pole is unavailable or the ground crew has never used one, the load can be expected to be hooked up to the helicopter by someone who also becomes part of the electrical path to ground.

Crossley, U.S. Pat. No. 1,757,111, describes an arrangement that provides an electrically conductive path between a flightcraft (a balloon) and ground, but is otherwise of little relevance here.

SUMMARY OF THE INVENTION

As is clear from the prior art, when a hovercraft flies low enough to pose a risk of electrocution to persons on the ground, it is also low enough so that that risk can be eliminated by establishing an alternate conductive path to ground. In the prior art, however, the means for providing that alternate path, weighted cables, grounded poles, etc., introduces a risk of damage to the hovercraft and/or injury to rescue personnel or to the persons they are intending to rescue that makes such means for providing the alternate path unacceptable.

In the present invention, the risk of electrocution by first contact with a flying hovercraft is eliminated via an alternate conductive path to ground in accordance with the teachings of the prior art, but the risk of damage to the hovercraft and/or injury to rescue personnel or to the persons they are intending to rescue is eliminated by completing the alternate path to ground via an electrically conducting liquid stream.

According to one embodiment of the present invention, and intended for permanent installation aboard a hovercraft, the electrically conducting liquid is contained in a reservoir and is delivered by a pump and suitable plumbing to a nozzle made of an electrically conducting material and affixed to the skin of the hovercraft. This nozzle, conductively connected to the hovercraft, produces a stream of the liquid that completes an electrical path to earth ground when the pump is activated.

In another preferred embodiment of the present invention, the reservoir, made of an electrically conducting material, is pressurized, and the liquid is delivered to the nozzle via an electrically conducting hose when a valve is opened. This portable embodiment is intended for use aboard a helicopter or a rescue craft, or in the water or on land, and the liquid stream is directed upward or downward as appropriate to complete an electrically conductive path to earth ground.

The upwardly directed stream arrangement is particularly preferred for pick-up or landing sites that involve flammables, explosives, or sensitive electronics because the site of sparking that might otherwise be at or near these sensitive materials when earth grounding is first established is, instead, transferred to the vicinity of the hovercraft. This spark site transfer, however, requires a more powerful stream than do the other upwardly-directed stream arrangements because the stream must reach the upper portions of the lift cable or even the hovercraft itself, and not just any portion of that cable or its conductively connected attachments, and in yet another preferred embodiment of the present invention, special features are introduced to accommodate the special stream requirements.

These, as well as other features, modifications, and advantages of the conductive charge removal system of the present invention are more fully described with reference to the annexed drawings of the preferred embodiments thereof.

DETAILED DESCRIPTION OF THE PREFERRED EMBODIMENTS

Figure 1:
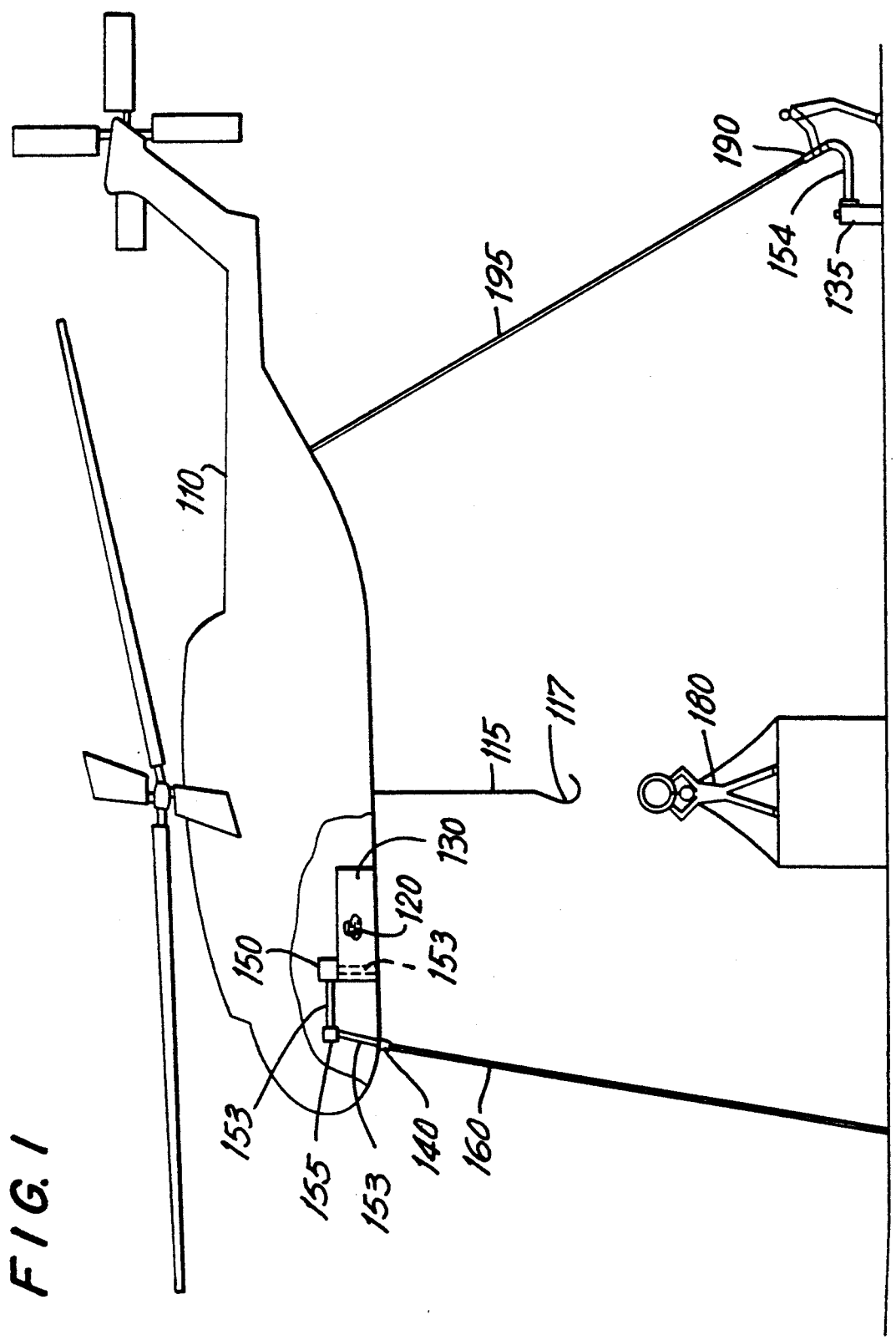
FIG. 1 is a pictorial view, partially cut away, of a helicopter, and illustrates two preferred embodiments in accordance with the present invention, one intended for permanent installation aboard the helicopter, and the other on the ground.

Referring initially to FIG. 1 in the drawings, a preferred apparatus for bringing the potential of a hovercraft to that of earth ground is shown in service aboard a large helicopter 110. In this embodiment, intended for permanent installation aboard the craft, the electrically conducting liquid 120 is stored in a reservoir 130 secured aboard the craft, and is delivered to a nozzle 140 via an electrically driven pump 150 and piping 153. Nozzle 140, mounted on the skin of helicopter 110, and made of an electrically conducting material such as metal, is also by this arrangement electrically connected to the skin of the craft, so that, when pump 150 is activated and optional solenoid valve 155 is opened, nozzle 140 produces a stream of electrically conducting liquid 160 that completes an electrically conductive path between the hovercraft and earth ground 170 before ground crew member 180, who would otherwise suffer the consequences of this role, makes contact with helicopter 110, its lift cable 115, or the cable termination 117. Because the purpose of this invention would obviously be defeated if the stream were to make first contact with ground crew member 180, nozzle 140, preferably mounted at a point remote from that at which lift cable 115 exits the fuselage of helicopter 110, produces a stream 160 that is directed away from cable 115 as shown.

Figure 2:
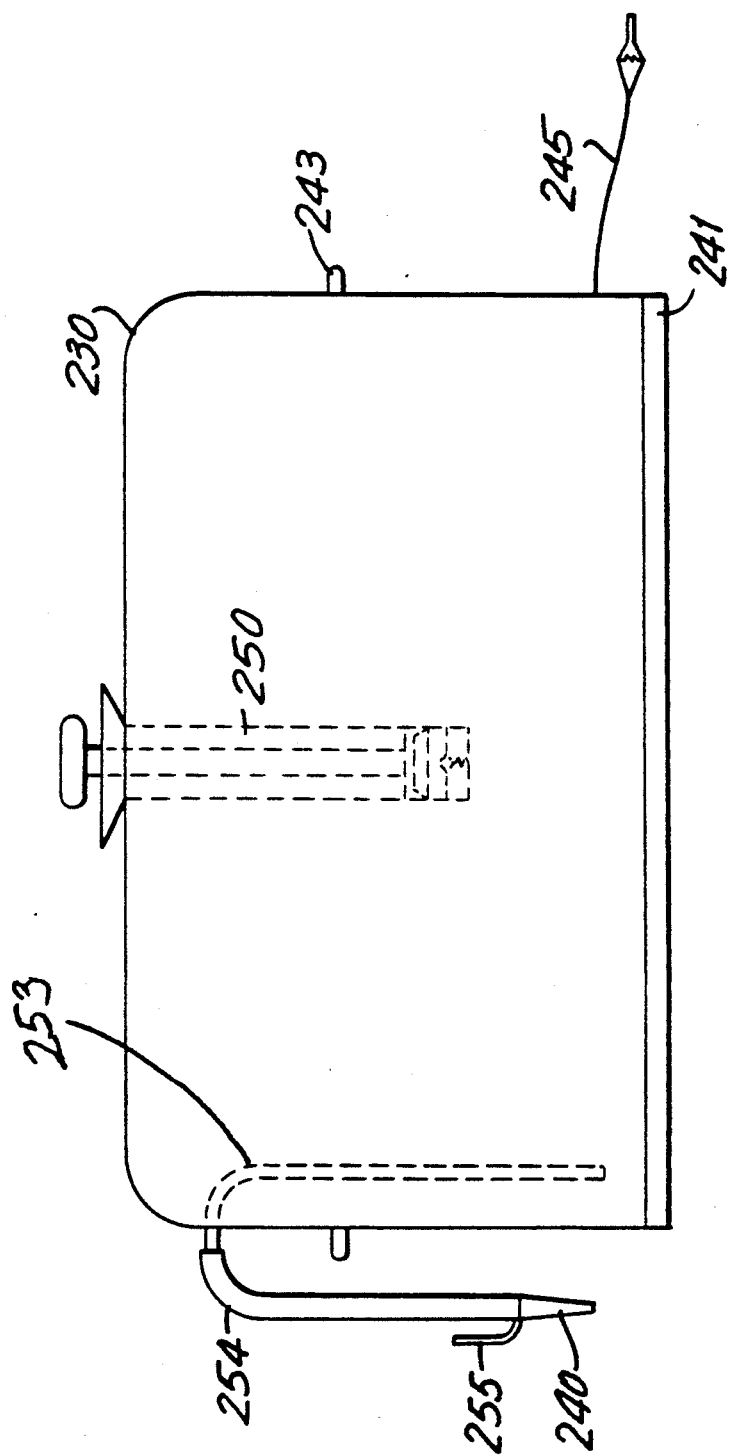
FIG. 2 is an elevational view of the preferred portable embodiment of the present invention.

The embodiment of FIG. 2 is the preferred portable embodiment of this invention, having a metallic tank 230 that serves as the reservoir for the electrically conducting liquid, a removable manually operated pressurizing pump 250 the opening for which is also the opening for filling the reservoir, and metallic tubing 253 and preferably conducting flexible hose 254 to transport the liquid to preferably metallic nozzle 240 when manual valve 255 is opened. Additional features of this embodiment include hold-down rings 243 that also serve as lifting handles, ground strap 245, and base weight 241 that maintains the proper orientation of this portable embodiment in water.

This FIG. 2 embodiment is intended for use aboard a hovercraft or a surface craft, or in the water or on land, and is readied for use by filling and pressurizing the reservoir and connecting it to a suitable ground, which might, for example, be the frame of the hovercraft, metal structures or piping on the ground, etc. Potential equalization from on board the hovercraft is effected as explained for the embodiment of FIG. 1, and for these other applications by directing the stream in such a way that it strikes the hovercraft or something electrically connected to it, such as the lift cable 115 or its termination 117.

In practicing this invention, it is important to understand that the primary electrical risk to ground personnel is that of electrocution by establishing first contact with a flying hovercraft, and that the risk from maintaining contact with the hovercraft thereafter is minimal, "worst case" charging currents being well under one milliampere as confirmed by tests on some of the largest helicopters and reported upon in the (U.S.) Naval Research Laboratories Report cited earlier herein. On this basis it becomes clear that the quantity of electrically conducting liquid in a portable unit that could be handled by one person and would otherwise appear to be marginal for the purposes of this invention is actually quite adequate. There are, however, special applications, those in which intended cargo and/or pick-up or landing sites involve flammables, explosives, or sensitive electronics for example, where the site of any sparking that may result from first contact with earth ground is preferably transferred from the proximity of these materials to one nearer to the hovercraft itself, and this transfer is effected by a stream directed upward from earth ground and powerful enough to reach the craft despite the "downwash" from the rotor of the hovercraft. One such arrangement is illustrated in FIG. 1 in which a nozzle 190 is connected to a standpipe 135 via a hose 154, and produces a stream 195 that reaches the hovercraft when a valve (not shown) is opened.

The electrically conducting liquids preferred for use in this invention are fresh or salt water (the conductivity of the former being adjusted in those few applications where necessary by adding a pinch or two of a substance such as table salt to the water in the reservoir), and parts such as reservoirs, nozzles, valves, etc., are preferably those that will perform their intended functions satisfactorily despite prolonged exposure to these liquids. These readily available liquids and equipment designed to accommodate them are preferred over arrangements based upon liquids that are custom-engineered with respect to conductivity, corrosion inhibition, non-Newtonian viscosity (to maintain stream continuity over a greater distance), etc., because such arrangements can be rendered inoperative (perhaps when most needed) when locally available supplies of these special liquids are exhausted.

Other embodiments, a partial listing of which includes pump, hose, and nozzle arrangements in which the electrically conducting liquid is water that is drawn directly from the body of water in which a victim is immersed, land-based embodiments having fixed or vehicle-mounted dedicated storage tanks, pumps, etc. for that liquid, and embodiments such as those of FIG. 1 but in which solenoid valve 155 is actuated by a wireless remote, are also considered to be within the scope of the invention. Accordingly, the above description should be considered as illustrative and not in a limiting sense, the scope of the invention being defined by the claims.

As used in the claims, the term "hovercraft" includes not only the craft itself, but also the lift cables, cable terminations, etc. in electrically conducting relation therewith, and the term "earth ground" includes not only the earth itself, but also tanks, reservoirs, piping, etc. in electrically conducting relation therewith.

I claim:

1. An apparatus for reducing the difference in electric potential between a flying hovercraft and earth ground, and comprising a means for producing a stream of electrically conducting liquid that bridges at least the air gap between said hovercraft and earth ground, and a means for transporting said electrically conducting liquid to said means for producing a stream.

2. The apparatus of claim 1 in which said means for producing said stream of electrically conducting liquid is a nozzle.

3. The apparatus of claim 2, and further comprising: means for storing said electrically conducting liquid, means for transporting said liquid from said means for storing to said nozzle, and means for controlling the discharge of said liquid from said means for storing to said nozzle.

4. The apparatus of claim 3, wherein said storing means is aboard said hovercraft, and wherein said nozzle is in electrically conducting relation with said hovercraft.

5. The apparatus according to claim 3, wherein said storing means is remote from said hovercraft and said means for producing said stream directs said stream toward said hovercraft, and further comprising means for establishing an electrically conducting path between said means for producing a stream of electrically conducting liquid during the passage of liquid through said nozzle and earth ground.

6. The apparatus of claim 5, further comprising means for discharging said stream from said nozzle with sufficient force to reach said hovercraft.

7. The apparatus of claim 6, wherein said discharging means comprises means for pressurizing the liquid in said storing means.

8. A process for reducing the difference in electric potential between a flying hovercraft and earth ground, and comprising producing a stream of electrically conducting liquid that:
(a) is in electrically conducting relation with said hovercraft,
(b) flows in the direction from said hovercraft toward earth ground, and
(c) bridges at least the air gap between said hovercraft and earth ground.

9. A process for reducing the difference in electric potential between a flying hovercraft and earth ground, and comprising producing a stream of electrically conducting liquid that:
(a) is in electrically conducting relation with said earth ground,
(b) flows in the direction toward said hovercraft from a location remote from said hovercraft, and
(c) bridges at least the air gap between said hovercraft and earth ground.

* * * * *